(12) United States Patent
Schroth et al.

(10) Patent No.: US 11,081,942 B2
(45) Date of Patent: Aug. 3, 2021

(54) APPARATUS FOR REDUCING DANGEROUS BEARING VOLTAGES

(71) Applicant: ebm-papst Mulfingen GmbH & Co. KG, Mulfingen (DE)

(72) Inventors: Sebastian Schroth, Kupferzell (DE); Marco Weckert, Dörzbach-Hohebach (DE); Manuel Walter, Schwäbisch Hall (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 81 days.

(21) Appl. No.: 16/686,644

(22) Filed: Nov. 18, 2019

(65) Prior Publication Data

US 2020/0083785 A1    Mar. 12, 2020

Related U.S. Application Data

(63) Continuation of application No. PCT/EP2018/064023, filed on May 29, 2018.

(30) Foreign Application Priority Data

May 30, 2017   (DE) .................... 10 2017 111 826.8

(51) Int. Cl.
   *H02K 11/40*       (2016.01)
   *H02K 5/15*        (2006.01)
   (Continued)

(52) U.S. Cl.
   CPC .............. *H02K 11/40* (2016.01); *H02K 5/15* (2013.01); *H02K 5/1735* (2013.01); *H02K 7/085* (2013.01)

(58) Field of Classification Search
   CPC .......... H02K 11/40; H02K 5/15; H02K 5/173; H02K 7/08; H02K 5/1735; H02K 7/085
   See application file for complete search history.

(56) References Cited

U.S. PATENT DOCUMENTS

| 2007/0182357 A1* | 8/2007 | Schrepfer | .............. | H02K 11/20 318/632 |
| 2010/0253158 A1* | 10/2010 | Mizukami | .............. | H02K 11/02 310/43 |

FOREIGN PATENT DOCUMENTS

| DE | 10 2004 016 738 B3 | 11/2005 |
| DE | 20 2015 103 902 U1 | 8/2015 |
| EP | 1 445 850 A1 | 8/2004 |

OTHER PUBLICATIONS

International Search Report dated Sep. 4, 2018 in corresponding PCT/EP2018/064023.

(Continued)

*Primary Examiner* — Naishadh N Desai
(74) *Attorney, Agent, or Firm* — Harness, Dickey & Pierce, P.L.C.

(57) ABSTRACT

An apparatus (1) for reducing bearing voltages in an electric machine (M) with a rotor (2) and a stator (3). A rotor-side and stator-side bearing outer ring (4r, 4s) and a respective bearing inner ring (4i) are provided between the rotor (2) and stator (3). A connection electronics system connect with the motor (M). A compensation arrangement (20) adjusts the potential (ULA-stator) of the bearing voltage at the bearing outer rings (4r, 4s) and the respectively corresponding bearing inner ring (4i) to an identical value. The compensation arrangement (20) comprises an impedance (ZKOMP), of at least one first impedance (ZKOMP, R) between the stator (3) and the rotor-side bearing outer ring (4r). The impedance (ZKOMP) has at least one impedance (ZKOMP.S) between the stator (3) and the stator-side bearing outer ring (4s).

14 Claims, 4 Drawing Sheets

(51) Int. Cl.
H02K 5/173 (2006.01)
H02K 7/08 (2006.01)

(56) References Cited

OTHER PUBLICATIONS

International Preliminary Report on Patentability (dated Dec. 3, 2019) and Written Opinion (dated Sep. 4, 2018) (in German and English) in corresponding PCT International Application PCT/EP2018/064023.

* cited by examiner

APPARATUS FOR REDUCING DANGEROUS BEARING VOLTAGES

CROSS-REFERENCE TO RELATED APPLICATIONS

This application is a continuation of International Application No. PCT/EP2018/064023, filed May 29, 2018, which claims priority to German Application No. 10 2017 111 826.8, filed May 30, 2017. The disclosures of the above applications are incorporating herein by reference.

FIELD

The present disclosure relates to an apparatus for reducing undesired bearing voltages in an electric machine, such as an EC motor.

BACKGROUND

Current variable speed motors are primarily fed by converters with an intermediate circuit. However, the feeding by converters with an intermediate circuit leads to bearing voltages which, in turn, may lead to bearing currents in the bearings of the motor. In electric machines, with roller bearings or sliding bearings, such current flow through the bearings may lead to damages up to total failure.

In the past, bearings insulated against current or electrically insulated bearings, such as bearings with a ceramic insulation on the outer ring or hybrid bearings with ceramic rolling bodies, were used to remedy this situation. However, since these bearings are very expensive, such a solution is not ideally suited for mass production.

Further remedy measures are known in the state of the art. For example, the documents EP 1 445 850 A1 and/or DE 10 2004 016 738 B3 teach us to use an apparatus for the protection of a bearing of an electric machine, that provides a compensation arrangement and/or a compensation device for generating a compensating current for the compensation of an interference current through the bearings.

When feeding an electric machine from a pulse-controlled inverter a capacitively injected bearing voltage arises. The switched pulse pattern of the inverter yields a common mode voltage (CMV) with respect to earth at its exit. The voltage is bouncing with the switching frequency of the inverter.

The document DE 20 2015 103 902 U is concerned with the issues that result therefrom. A voltage is formed between the inner bearing and bearing outer ring and the ball of the bearing that is running on an insulating oil film. If an insufficient insulation of the oil film and/or too high bearing voltages bring about a breakdown of the insulation, the capacity of the oil film as well as further parallel parasitic capacities of the overall structure discharge and an equalization of the charge carriers between the inner bearing and bearing outer ring takes place (electric discharge machining), that may lead to bearing damages.

For this purpose, the document DE 20 2015 103 902 U suggests the introduction of a capacity. It is selected to be significantly higher than the parasitically arising capacitors in the remaining network. Based on this measure the stator will be almost connected to ground potential (GND) in the relevant frequency range. A connection between the ground potential and a protective conductor is established primarily by the Y capacitor installed in the EMC filter. Such connection may, due to the large capacities of the EMC filter for frequency ranges where bearing voltages are caused by PWM clocking, almost be considered a short circuit. However, through the other existing capacities a voltage can build up either on the bearing outer ring or the rotor and/or the bearing inner ring conductively joined thereto, such that the solution of DE 20 2015 130902 U only partially eliminates the problem on which the disclosure is based.

Furthermore, it is presumed that the linkage of the stator to ground potential in the relevant frequency range exists. In this case the ratios of a parasitic capacity between the winding and the bearing outer ring and the bearing outer ring to the stator are dominant for the voltages at the bearing outer ring of the stator-side bearing. The ratio between the parasitic capacity between the winding and the bearing outer ring and the capacity between the bearing outer ring and the stator in this case typically ranges between 1:1 to 1:5. Under the assumption that there are no further capacities applied to the rotor a potential of about 16-50% of the intermediate circuit voltage would arise at the bearing outer ring.

For the potential of the rotor-side bearing outer ring the capacities between the winding to the rotor-side bearing outer ring as well as between the stator and the rotor-side bearing outer ring are relevant. The theoretical ratios here are like those on the stator-side bearing.

The potentials at the rotor are decisively determined by the ratio of the capacities between the winding and the rotor as well as by the capacities of the rotor with respect to earth and/or the protective conductor potential and the capacity of the rotor with respect to the stator. An additional detuning of the above-mentioned potential arises through the capacities of the stator-side and rotor-side bearings as well as other small parasitic capacities. If such voltages, which are above the insulation resistance of the lubrication film between the running surface and the ball, apply between the bearing outer ring and the bearing inner ring and/or the rotor conductively joined thereto, this brings about a breakdown and a roughening of the running surface.

The disclosure is therefore based on the object of overcoming the above-mentioned problems. It supplies a solution where undesired bearing voltages and bearing currents resulting therefrom can effectively be reduced or completely prevented.

SUMMARY

This object is solved by an apparatus for reducing bearing voltages in an electric machine with a rotor and a stator. A rotor-side and a stator-side bearing outer ring and a respective bearing inner ring are provided between the rotor and the stator. A connection electronics system connects with the motor. A compensation arrangement is provided with the connection electronics, the compensation arrangement adjusts the potential of the bearing outer rings and the respective corresponding bearing inner ring to an identical value or sets it to an approximating value. The compensation arrangement comprises an impedance ($Z_{KOMP}$) of at least a first impedance ($Z_{KOMP,\ R}$) between the stator and the rotor-side bearing outer ring. The impedance ($Z_{KOMP}$) has at least a second impedance ($Z_{KOMP,\ S}$) between the stator and the stator-side bearing outer ring.

The basic concept of the disclosure lies in that by adapting the capacity network of an electric machine or motor the potentials of the bearing outer ring and bearing inner ring are adapted to the same value, exemplarily through the two voltage dividers winding—bearing outer ring—ground potential and winding—bearing inner ring—ground potential. For this purpose, the occurring capacities of the machine's and/or motor's capacity network between the stator winding and the bearing are specifically aligned.

Therefore, according to the disclosure an apparatus for reducing bearing voltages in an electric machine with a rotor and a stator is provided. The rotor-side and stator-side bearing outer rings and a respective bearing inner ring are provided between the rotor and the stator. A connection electronics system for connection of the motor is provided. A compensation arrangement is provided to adjust the potential of the bearing voltage at the bearing outer ring and the respectively corresponding bearing inner ring to an identical value. Furthermore, the above-mentioned compensation arrangement comprises an impedance consisting of a first (aligned) impedance between the stator and the rotor-side bearing outer ring and a second (aligned) impedance between the stator and the stator-side bearing outer ring.

For a well working compensation of the bearing voltage, the potentials of the rotor as well as the bearing outer rings are the same value. This is achieved, for instance, by capacitively injecting a common mode voltage with a higher or lower potential on the bearing outer ring.

For the implementation of the concept according to the disclosure the solutions described in more detail below suggest themselves.

In a preferred embodiment of the disclosure, the compensation of the bearing voltage with a stator connected to earth through an impedance is provided. For this purpose. it is further provided that the compensation arrangement comprises a coupling of the stator to the ground reference potential of the connection electronics system through a defined capacity.

With the present disclosure, unlike the state of the art, there is no matching of the impedances, but instead a targeted matching of the potentials with respect to earth and/or of the voltages above the bearing. A combination of coupling the stator to the ground reference potential of the commutation electronics system does not only lead to a reduction of the bearing voltage but also to an improvement in the EMC features through a constant ungrounded stator potential by leakage currents caused by the common mode not flowing through the ground conductor but immediately back into the electronics system.

By means of a capacity the stator pack is pulled to a lower potential with respect to earth compared to the rotor potential. Thus, there is a higher potential at the bearing outer ring than at the stator or rotor due to the voltage divider between the winding and the bearing outer ring and between the bearing outer ring and the stator. This is a requirement for decreasing the voltage pitch of the capacities between the winding, the bearing outer ring and the stator by introducing an additional impedance and for the potential at the bearing outer ring sinking until the voltage remaining at the bearing reaches uncritical values.

Furthermore it is possible, for instance, by intervening in the geometrical dimensions to vary the voltage divider from the capacity between the winding and the bearing outer ring and the capacity between the bearing outer ring and the stator, for instance, by enlarging the distance of the winding from the bearing. It would also be possible to achieve an increase of the capacity between the stator and the bearing outer ring, for instance by, a decrease of the distance from the bearing outer ring to the stator.

An advantage of the present disclosure as compared to solutions known in the art is that through a change in the rotor mountings and the associated change in a potential between the rotor and protective earth, a compensation by changing the capacity towards the ground reference potential can be achieved. This is precisely why a change of the geometrical dimensions in the motor are unnecessary.

Furthermore, by installing an impedance from the bearing outer ring to the stator, the potential equalization can be achieved without having to make any significant geometrical changes.

Moreover, the linkage can be very easily achieved especially in external rotor motors. Here, the bearing outer ring and the stator are static and located close to each other. The bearing seat of the motor has cavities that can be used to establish a joint between the bearing outer ring and the stator lamination. This occurs by, for example, a clamp or a clip having the desired impedance.

It is further preferred that at least one of the two impedances in the bearing seat or in a cavity is arranged in an electrical connection arrangement between the stator and the bearing outer ring.

In a further possible solution, according to the concept of the present disclosure, it is provided that the compensation arrangement for changing the bearing voltage provides at least one bearing shield between the motor winding and the rotor-side and/or stator-side bearing outer ring and the stator.

For this purpose, it is advantageous that the bearing shield is inserted into a bearing pocket around the bearing outer ring as a shielding ring.

The advantages are that the shielding ring can be manufactured during production as an inlay part. It does and does not require any direct electrical connection to the bearing outer ring. Thus, no electrical contact must be in place between the bearing outer ring and the shielding ring. Over time, it might corrode or influence the bearing through a mechanical contact pressure. Furthermore, distortions of the bearing are avoided and no intervening with the mechanical system of the bearing seat is necessary.

The shielding ring is introduced into the electrical field between the winding and the bearing outer ring and optionally linked to the stator through a capacity.

It is especially advantageous if a first bearing shield is provided for the rotor-side bearing outer ring. A second bearing shield, that is different from the first bearing shield at least regarding the divider ratios, is provided for the stator-side bearing outer ring (separated therefrom).

In a further possible solution according to the concept of the present disclosure, it is provided that the compensation arrangement is realized at stator laminations that are insulated against each other. In novel methods, such as a baking enamel or insulation material coating of the stator laminations, the electrical contact between the laminations is separated in a targeted manner. This insulation can be used in a targeted manner to reduce bearing voltages.

Considering, for this purpose, the equivalent circuit diagram for bearing voltages, the capacity between the stator and the bearing outer ring does not change as a single capacity due to the insulation between the stator laminations, but as a combination of a plurality of capacities. If a common mode voltage is applied to the winding a potential to earth (PE) arises at each of the laminations, due to the capacitive coupling to the winding, or across single laminations. In this case, the potentials of the single laminations are not necessarily identical. But due to the large capacities between the stator laminations it can be expected that the potentials of immediately adjacent laminations only have small differences.

In an advantageous design of the disclosure it is therefore provided that the coupling of the stator to the ground reference potential occurs through at least a number of stator laminations of the stator that are insulated with respect to the other stator laminations to adjust the potential of the bearing outer ring to the potential of the rotor.

Thus, the potential of the bearing outer ring is no longer significantly maintained by one single lamination but by a weighting of the potentials of the single laminations and weighted according to their capacitive coupling to the bearing outer ring. The potential of the bearing outer ring is adapted to the potential of the rotor through a targeted grounding of single stator laminations. The more laminations are connected to ground in the proximity of the bearing outer ring, the further the potential with respect to earth will sink. Those laminations that are not linked to the ground reference potential on the other hand increase the potential of the bearing outer ring with respect to the earth potential.

One distinct advantage of this solution is that the voltage divider of the capacities between the winding, the bearing outer ring and the stator can be separately matched for the stator-side and for the rotor-side bearing, respectively. The bearing voltage is therefore adaptable to minimum values.

Furthermore, a lamination group can be created by a targeted insulation between the layers of multiple electrically joint laminations. Within the lamination group the potential is identical. The desired potential can be set through the number of the laminations belonging to a lamination group as well as the selection of the grounded lamination groups.

As an alternative to a linkage to the ground reference potential an earthing can be used. The explained principle for that case is analogous. The linkage of the single laminations to the earth potential can take place, for instance, by means of a pin that is passed through the lamination packs. If single laminations or lamination packs are not to be linked, a recess or an insulation is provided at the passing site of the pin so that the pin does not possess a conductive contact to the laminations concerned.

It is therefore provided, with regard to an advantage, that the stator laminations coupled to the ground reference potential or the earth potential are electrically joined to each other through a conductive pin penetrating the stator laminations.

In a further possible solution according to the concept of the disclosure, it is provided that the compensation arrangement occurs through a rotor earthing and a bearing earthing combined with a linkage of the stator to ground. This is especially advantageous in applications in conductive liquids.

In accordance with the disclosure, an apparatus is proposed for this purpose, where the rotor is in electrical communication with the earth potential (PE) by a conductive liquid. The rotor-side and stator-side bearing outer rings are joined to each other through an electrical connection that is guided along or through the stator.

It is especially advantageous, if the stator-side bearing outer ring is further joined to the earth potential (PE).

A further aspect of the present disclosure relates to an electric motor, preferably an EC motor formed with an apparatus as described above.

A further aspect of the present disclosure relates further to a method for adapting an above-described apparatus to a changed application condition, where the potential of the rotor is decreased with respect to the ground reference potential by setting the potential of the bearing outer ring, depending on the potential of the rotor, to a respectively lower value. To therefore achieve for many applications as wide a compensation of the bearing voltage as possible, it is purposeful to set the bearing outer ring to a lower potential than the potential of the rotor. If the rotor potential is then decreased with respect to earth during the application, for instance by additional conductive items in the proximity of the rotor, the voltage will first become smaller above the bearing. Only in the case of very large capacitive couplings of the rotor to earth will the bearing voltage then rise to critical values.

Other advantageous further developments of the disclosure are characterized in the dependent claims or are presented in detail below along with the description of the preferred embodiment of the disclosure based on the Figures.

DRAWINGS

The drawings described herein are for illustrative purposes only of selected embodiments and not all possible implementations, and are not intended to limit the scope of the present disclosure.

DETAILED DESCRIPTION

In the following, the disclosure is described in more detail using exemplary embodiments shown in FIGS. 1 to 8, wherein like numerals indicate like functional and/or structural features.

Figure 1:
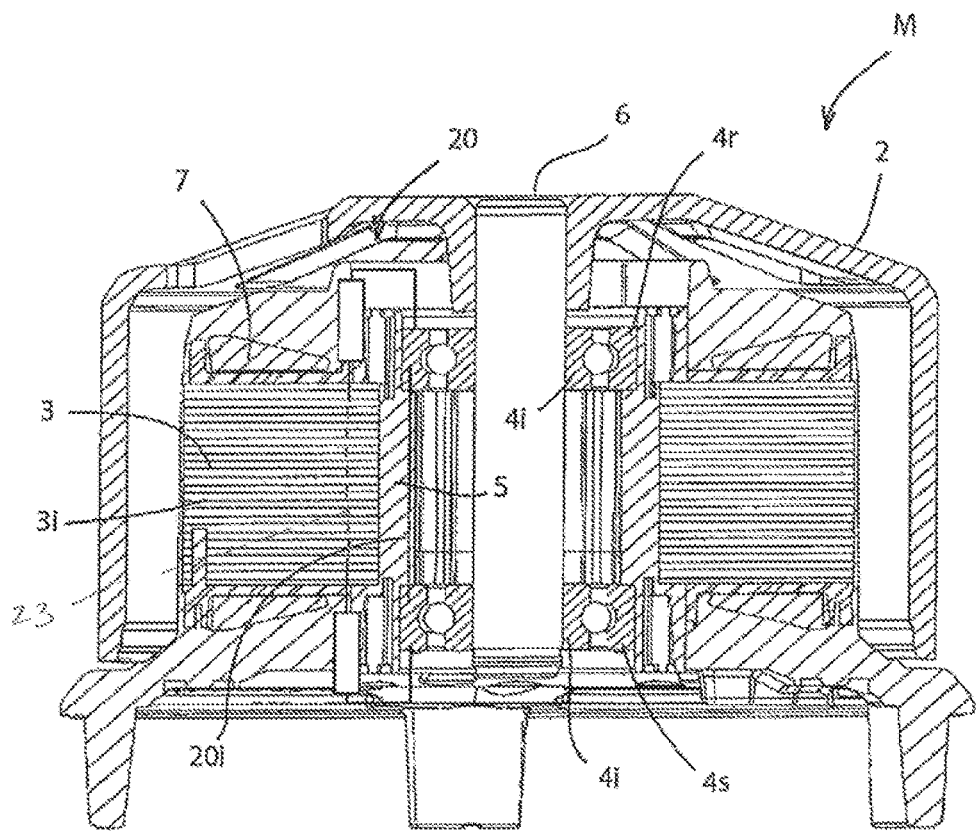
FIG. 1 is a sectional view through a motor according to a first embodiment.
Figure 2:
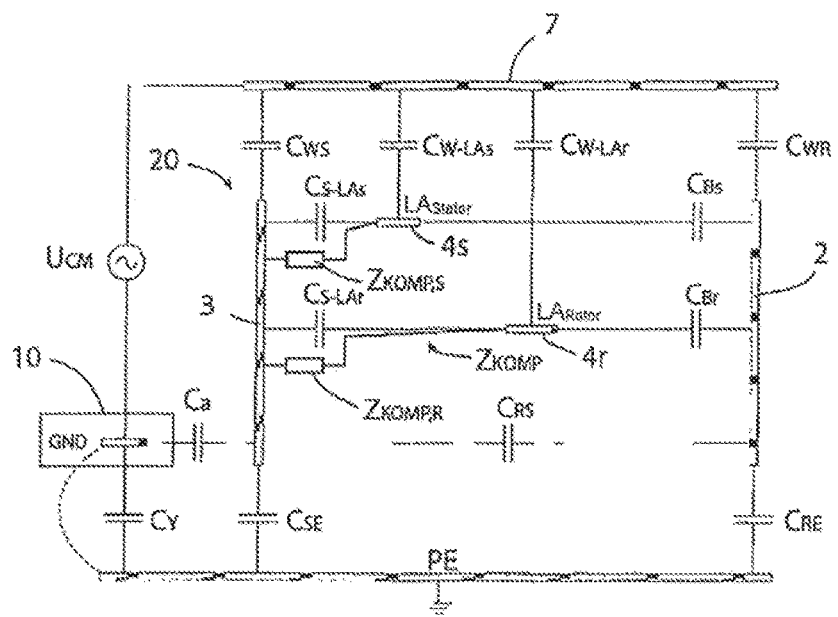
FIG. 2 is an equivalent circuit diagram of the capacity network for the embodiment according to FIG. 1.

FIG. 1 depicts a sectional view through an electric motor M with an apparatus for reducing bearing voltages at the bearings $4r$, $4s$, $4i$ according to a first embodiment.

The motor M has a rotor 2 and a stator 3 formed of stator laminations $3i$.

Between the rotor 2 and the stator 3 a rotor-side and a stator-side bearing outer ring $4r$, $4s$, respectively, and a respective bearing inner ring $4i$ are provided. Further depicted are the shaft 6 and the winding 7 of the motor M. Here the bearings at the outer ring $4r$, $4s$ are electrically insulated against the other metallic parts through an insulation 5.

A compensation arrangement 20 is provided to adjust the potential of the bearing voltages at the bearing outer rings $4r$, $4s$ and the respective corresponding bearing inner ring $4i$ to an identical value. The compensation arrangement 20 includes a coupling of the stator 3 to the ground reference potential (GND) of the connection electronics system through a defined capacity $C_a$, as shown in the equivalent circuit diagram in FIG. 2. The equivalent circuit diagram represents the capacity network for the embodiment according to FIG. 1. Two actively introduced impedances $Z_{KOMP, R}$, $Z_{KOMP, S}$ and the systemic capacities $C_{ws}$, $C_{W\text{-}Las}$, $C_{W\text{-}LAr}$, $C_{WR}$, $C_{BS}$, $C_{BR}$, $C_{RS}$, $C_{RE}$, $C_{SE}$, $C_Y$, $C_{S\text{-}LAs}$, $C_{S\text{-}Lar}$ are shown which, however, will not be described in greater detail. Furthermore, the potential PE of the protective earth is depicted in the network.

The compensation arrangement 20 is realized by an impedance $Z_{KOMP}$ consisting of a first impedance $Z_{KOMP,R}$ between the stator 3 and the rotor-side bearing outer ring 4r and a second impedance $Z_{KOMP,S}$ between the stator 3 and the stator-side bearing outer ring 4s.

Furthermore, the compensation arrangement 20 can be equipped with an electrical connection 20i between the rotor-side bearing outer ring 4r and the stator-side bearing outer ring 4s, as shown in FIG. 1.

Figure 3:
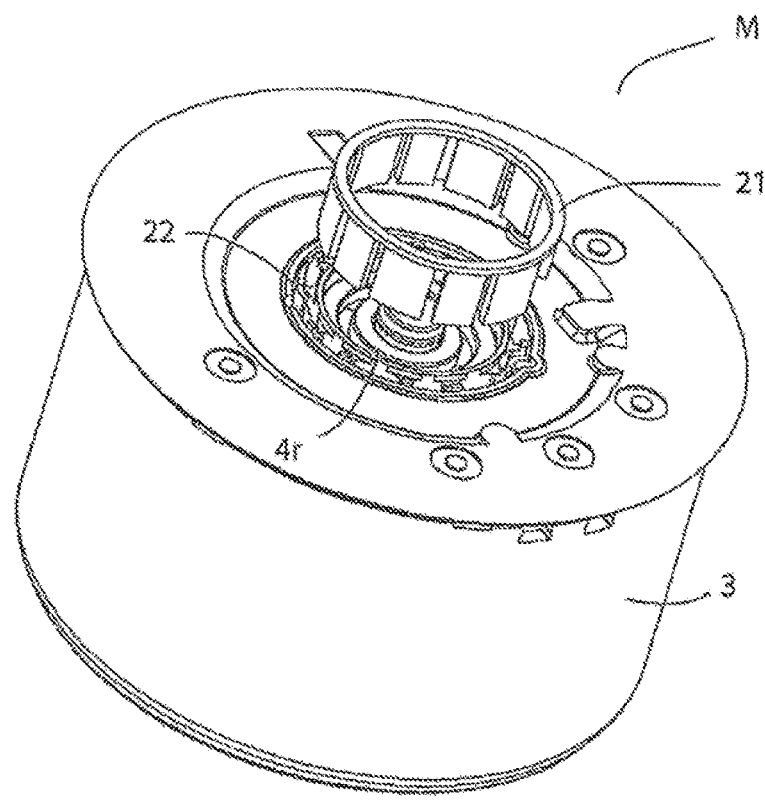
FIG. 3 is a representation of a second embodiment of the disclosure with a bearing shield.
Figure 4:
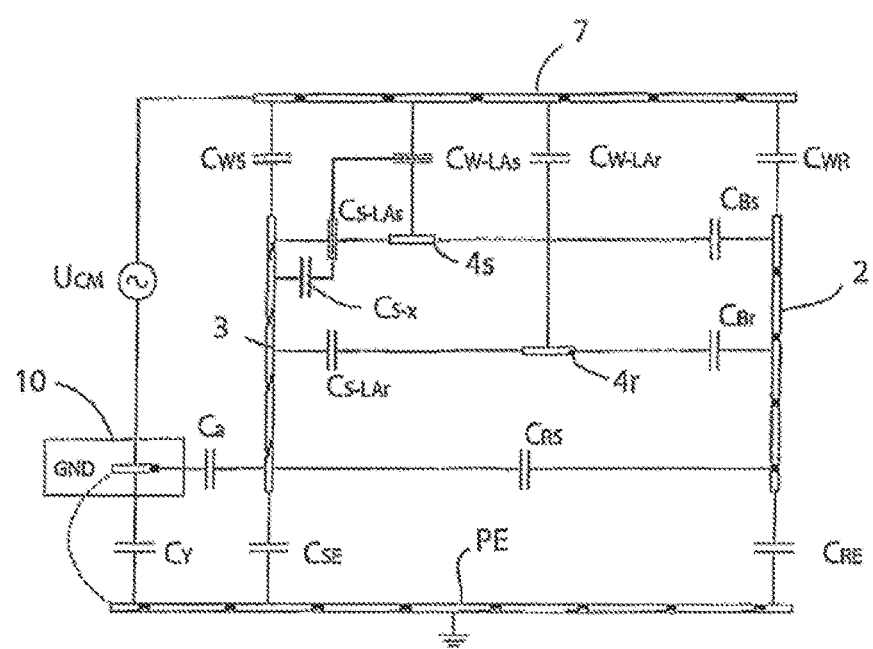
FIG. 4 is an equivalent circuit diagram of the capacity network for the embodiment according to FIG. 3.
Figure 5:
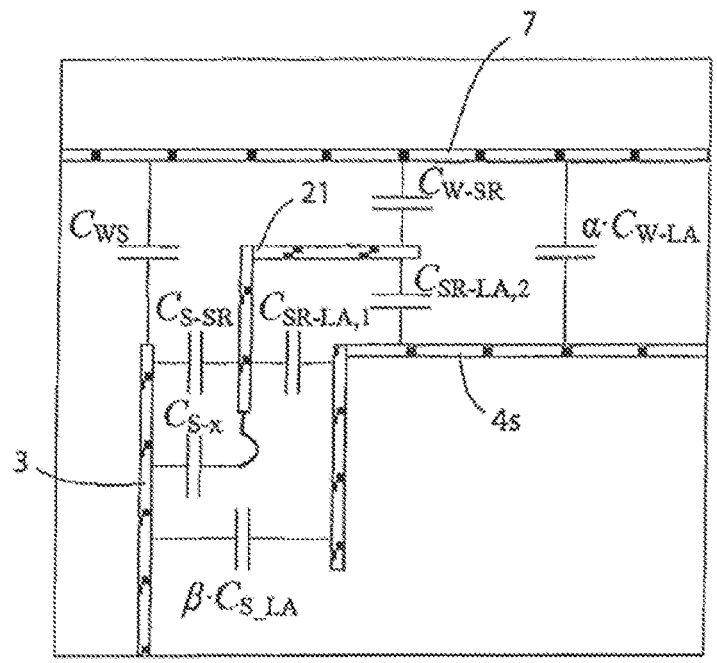
FIG. 5 is one detail of the equivalent circuit diagram of the capacity network for the second embodiment according to FIG. 3.

With the help of FIGS. 3 to 5, an embodiment of the disclosure with a bearing shield 21 is explained. FIG. 4 is an equivalent circuit diagram of the capacity network with a closer detail of the equivalent circuit diagram in FIG. 5. This compensation arrangement 20 of the motor M serves to change the bearing voltage by a bearing shield 21. It is introduced between the motor winding 7 and the rotor-side and/or stator-side bearing outer ring 4r, 4s and the stator 3. The stator 3 is embodied as an encapsulated stator. The bearing shield 21 is inserted into a bearing pocket 22 around the bearing outer ring 4r as a shielding ring.

The functioning of this compensation arrangement 20 is explained in more detail based on a shielding ring 21 at the stator-side bearing 4r, 4i in relation to the equivalent circuit diagrams of FIGS. 4 and 5. The shielding ring 21 is introduced into the electrical field between the winding 7 and the bearing outer ring 4s and is joined to the stator 3 through a capacity $C_{S-X}$. Depending on the overlapping surface of the inserted shielding ring 21 a remainder capacity $\alpha C_{W-LA}$ of the original capacity $C_{W-LAs}$ (without the shielding ring 21) remains from the winding 7 to the bearing outer ring 4s. The remainder of the capacity is split between the capacity $C_{W-SR}$ and the capacity $C_{W-LAs}$. The same effect arises between the stator 3 and the bearing outer ring 4s. Here, the capacity $C_{S-LAs}$, which exists without the shielding ring 21, splits into two capacities $C_{S-SR}$ and $C_{SR-LA,1}$ above the shielding ring 21.

If the potential of the bearing outer ring 4s is matched with that of the rotor 2 by the shielding ring 21, the bearing voltage is decreased. However, if the potential of the bearing voltage is to be further adapted (because the effect is not sufficient with the shielding ring 21 alone), the potential difference of the shielding ring 21 to the potential of the stator 3 can be further adapted by installing an additional capacity $C_{S-X}$. If $C_{S-X}$ is switched opposite of the winding 7 a decrease of the potential difference to the winding 7 takes place. For this purpose, the capacity $C_{S-X}$ does not have to be embodied as a discrete element as shown in FIG. 4 but can alternatively be adapted via a parasitic capacity through the mechanical structure or selection of the dielectric.

A shielding ring 21 may also be introduced for the rotor-side bearing 4r. The electrical mechanism of action is the same. However, since the adaptation of the potential of the bearing outer ring 4r also entails a change of the rotor potential, and vice versa, the alignment must be done separately when using two shielding rings 21.

Furthermore, it is possible to electrically join the two bearing outer rings 4r, 4s through a junction line, such that the compensation can be performed with a shielding ring 21. For this purpose, the shielding ring 21 may be directly embedded into the motor M and/or overmolded. A further possibility is to embody it as a connector clip and to position it within the cavities of the bearing seat (for instance in the bearing pockets 22).

Figure 6:
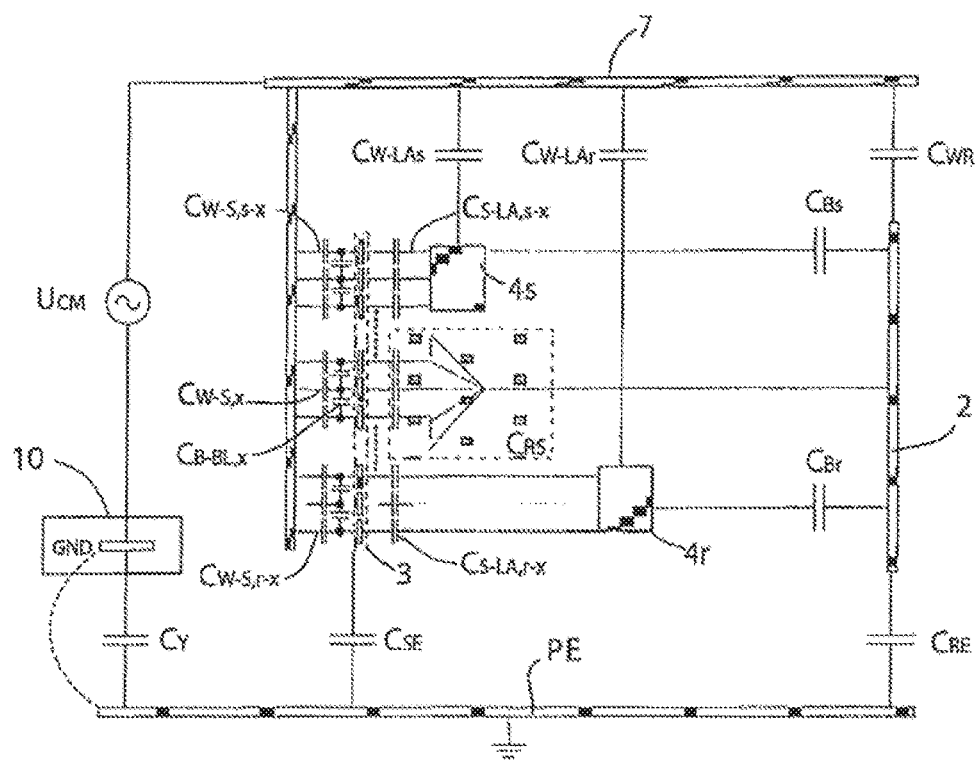
FIG. 6 is an equivalent circuit diagram of the capacity network for a further embodiment.
Figure 7:
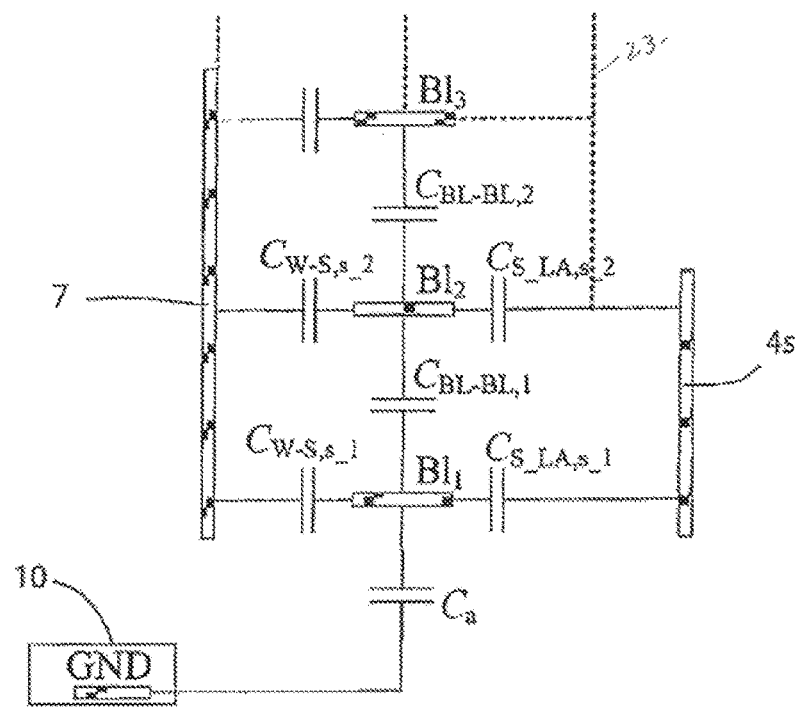
FIG. 7 is one detail of the equivalent circuit diagram of the capacity network for the embodiment according to FIG. 6.

With respect to FIGS. 6 and 7 a further example embodiment is explained using equivalent circuit diagrams. The compensation arrangement 20 is realized by stator laminations 3i that are insulated against each other. The insulation between the stator laminations 3i is utilized in a targeted manner to reduce the bearing voltage. The bearing voltage equivalent circuit diagram in FIG. 6 shows the influence of the insulation between the stator laminations 3i to the effect that the capacity $C_{S-LA}$ is not formed as a single capacity but from a plurality of capacities. The capacities are therefore shown in FIG. 6 as follows. $C_{W-S,s-x}$ represents the single capacities of the winding 7 to the stator 3, in which the $x^{th}$ concerned stator lamination 3i also has a high coupling to the stator-side bearing outer ring 4s. $C_{W-S,r-x}$ represents the single capacities of the winding 7 to the stator 3 where the respective stator lamination 3i also has a high coupling to the rotor-side bearing outer ring 4r. $C_{W-S,x}$ represents the single capacities of the winding 7 to the respective stator lamination 3i where the stator lamination 3i has no or merely a negligible coupling to the bearing outer rings 4s, 4r. $C_{BL-BL,x}$ designates the capacity between two laminations 3i and $C_{RS}$ consists of a plurality of capacities having a coupling of the stator laminations 3i to the rotor 2.

The capacities $C_{S-LA,s-x}$ and $C_{S-LA,r-x}$ between the stator 3 and the stator-side bearing outer ring 4s and/or the rotor-side bearing outer ring 4r represent the coupling capacity of the $x^{th}$ stator lamination 3i to the corresponding bearing outer ring.

If a common mode voltage $U_{CM}$ is applied to the winding 7, a potential to earth (PE) arises at each stator lamination 3i, due to the capacitive coupling to the winding 7, or across the single stator laminations 3i. A linking, via a pin 23, to ground of single lamination 3i through a capacity occurs, yielding a voltage divider from a plurality of capacities, as depicted in FIG. 7.

Figure 8:
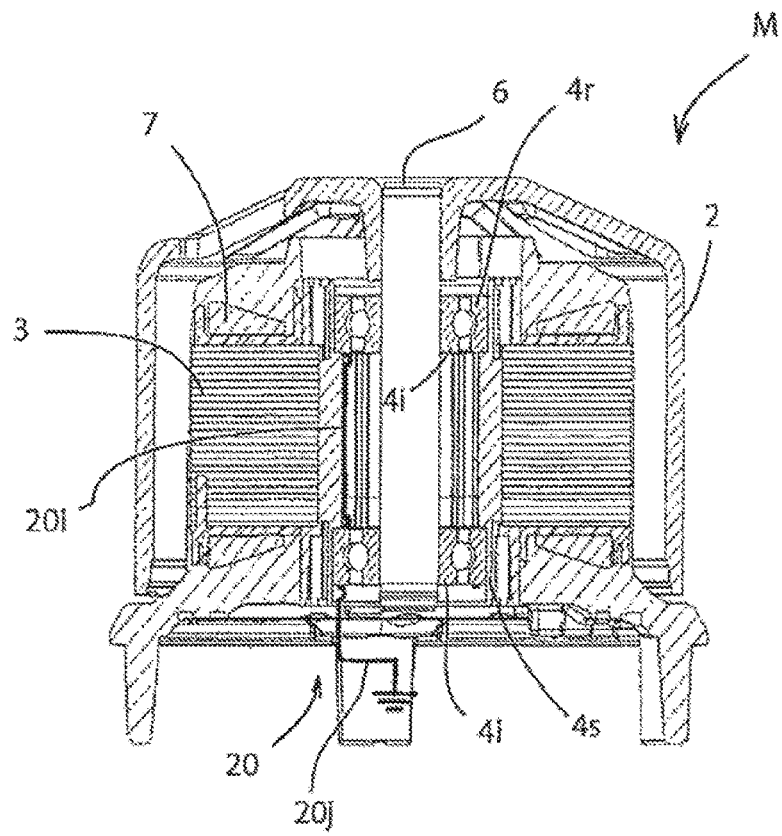
FIG. 8 is a representation of a further example embodiment.

FIG. 8 is a representation of a further example embodiment. In applications where the rotor 2 is operated in conductive, earthed or grounded media the potential of the rotor 2 to earth PE is reduced. In extreme cases, i.e. in cases of high conductivity, the rotor 2 identically has the earth potential PE. Due to the voltage divider of the capacities from the winding 7 to the bearing outer ring 4r, 4s to the stator 3, a remainder potential is yielded at the bearing outer ring 4r, 4s. In this context, the voltage above the bearing rises due to the earthing of the rotor 2.

In this embodiment a conductive joint 20i between the two bearing outer rings 4r, 4s is used. This connection runs in the stator 3, wherein the space between the shaft 6 and the stator 3 is utilized. The stator-side bearing outer ring 4s is connected to earth PE via the joint 20j in addition to the joint 20i between the two bearings. Thus, a short circuit can be achieved between the bearing inner ring 4i, the rotor through earth and the conductive liquid. If the medium in which the rotor 2 or its shaft is rotating has a conductivity that is too low the conductivity can be improved by an electrode and by adding salts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for reducing bearing voltages in an electric machine (M) comprising:

a rotor and a stator;

a rotor-side and a stator-side bearing outer ring and a respective bearing inner ring are provided between the rotor and the stator;

a connection electronics system for connection of the motor (M), including a compensation arrangement formed to adjust the potential of the bearing outer rings and the respective corresponding bearing inner ring to an identical value or set it to an approximating value, wherein the compensation arrangement comprises an impedance ($Z_{KOMP}$) consisting of at least a first impedance ($Z_{KOMP,\ R}$) between the stator and the rotor-side bearing outer ring, and wherein the impedance ($Z_{KOMP}$) has at least a second impedance ($Z_{KOMP,\ S}$) between the stator and the stator-side bearing outer ring.

2. The apparatus according to claim 1, wherein the compensation arrangement comprises a coupling of the stator to the ground reference potential (GND) of the connection electronics system through a defined capacity ($C_a$).

3. The apparatus according to claim 2, wherein a setting of the bearing voltage is carried out through the combination of the capacities ($C_a$) and ($Z_{KOMP}$).

4. The apparatus according to claim 2, wherein the sensitivity of the potential at the bearing outer ring regarding tolerances of the voltage divider including the capacities ($C_a$) and ($Z_{KOMP}$) is reduced through a pre-adaptation of the stator potential by the capacity ($C_a$) to a potential below or above the potential of the bearing inner ring.

5. The apparatus according to claim 1, wherein at least one of the two impedances ($Z_{KOMP,s}$, $Z_{KOMP,\ s}$) is arranged in the bearing seat or a cavity in an electrical connection arrangement between the stator and the bearing outer ring.

6. The apparatus according to claim 1, wherein the compensation arrangement for changing the bearing voltage provides at least one bearing shield between the motor winding and the rotor-side and/or the stator-side bearing outer ring and the stator.

7. The apparatus according to claim 6, wherein the bearing shield is inserted or mounted or fixed into a bearing pocket around the bearing outer ring as a shielding ring.

8. The apparatus according to claim 6, wherein a first bearing shield is provided for the rotor-side bearing outer ring and a second bearing shield is provided for the stator-side bearing outer ring, wherein the set potentials at the bearing outer rings are different with respect to earth potential (PE).

9. The apparatus according to claim 1, wherein the coupling of the stator to the ground reference potential (GND) occurs via at least a number of stator laminations of the stator, which are insulated against the other stator laminations of the stator to adjust the potential of the bearing outer ring to the potential of the rotor.

10. The apparatus according to claim 9, wherein at least a subset of the stator laminations coupled to the ground reference potential (GND) are electrically joined to each other through a conductive pin penetrating the stator laminations.

11. The apparatus according to claim 1 wherein the rotor is in electrical communication with the earth potential (PE) by conductive liquid, and the rotor-side and stator-side bearing outer rings are joined to each other through an electrical connection guided along or through the stator.

12. The apparatus according to claim 1, wherein the stator-side bearing outer ring is further connected to the earth potential (PE).

13. An electric motor (M) formed with an apparatus according to claim 1.

14. A method for adapting an apparatus according to claim 1 to an application condition influencing at least the bearing voltage by decreasing the potential of the rotor with respect to the ground reference potential (GND) the potential at the bearing outer ring being set to a respective corresponding lower value depending on the potential of the rotor.

\* \* \* \* \*